May 1, 1951     C. BRANDON     2,550,962
PRISM MOUNTING FOR TELESCOPES
Filed May 10, 1947
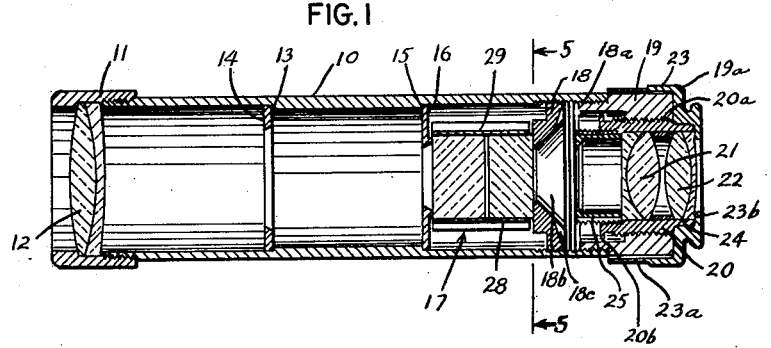
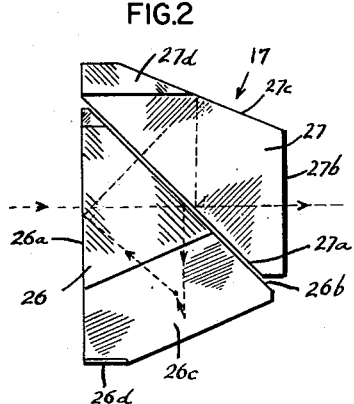
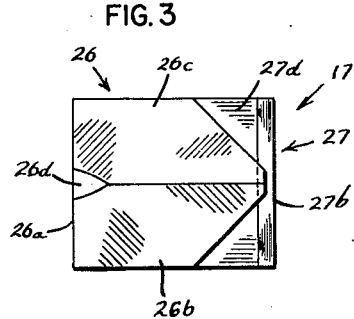
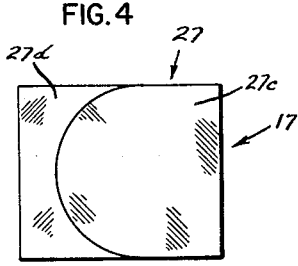
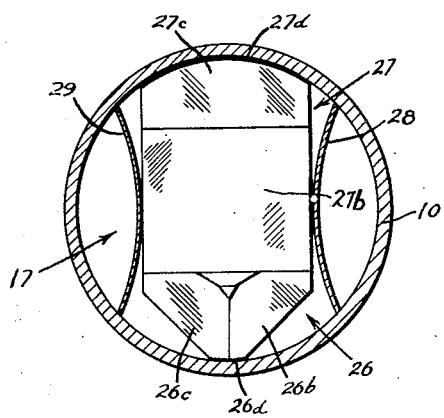
INVENTOR
CHESTER BRANDON
BY
ATTORNEYS Patented May 1, 1951

2,550,962

UNITED STATES PATENT OFFICE 2,550,962

PRISM MOUNTING FOR TELESCOPES

Chester Brandon, Malverne, N. Y., assignor to Kollmorgen Optical Corporation, Brooklyn, N. Y., a corporation of New York Application May 10, 1947, Serial No. 747,202

3 Claims. (Cl. 88—33)

This invention relates to improvements in optical instruments and it relates particularly to monocular and binocular telescope systems.

Telescope systems of the type commonly used for sports and by the armed forces are divided generally into two classes, namely, the prism type and the all-lens or non-prism type. The prism type of telescope of six to eight power usually is relatively short, but these telescopes are rather bulky in transverse dimensions because of the shape and size of the prisms. Moreover, inasmuch as the prisms must be mounted securely in the casing of the telescope, a sturdy mount must be provided which makes such telescopes relatively heavy.

The non-prism or all-lens type of telescope is somewhat less heavy than the prism type, but, on the other hand, they are substantially longer than a prism telescope of equal power. Usually, also, they have a more limited field than a prism telescope of the same power.

An object of the present invention is to provide a very compact and light-weight telescope having a relatively high magnifying power.

Another object of the invention is to provide a prism telescope in which the prisms are mounted in a very simple manner, thereby permitting the length of the telescope and its weight to be reduced to a minimum.

Another object of the invention is to provide a prism telescope in which the prisms are of a type that permits the lens and prism system to be mounted in a cylindrical tube of relatively small diameter and short length, as compared with other telescopes of equal power, field and light-transmitting characteristics.

Other objects of the present invention will become apparent from the following description of a typical telescope embodying the present invention.

In accordance with the present invention, I have provided a telescope which may be used as a monocular telescope or which may be assembled with another like telescope to form binoculars or field glasses.

The lens system may include a suitable objective lens and an eye lens combination which are mounted in the opposite ends of a lens tube and a prism or compound prism of the type disclosed in the British patent to Astorri No. 115,101, dated May 2, 1918. This prism effects complete inversion of an image both vertically and horizontally while causing the axis of the emergent beam of light to remain coincident with the axis of the entering beam. This prism usually consists of two components, one of which is triangular, while the other is a triangular roof-prism. The combined prisms reflect the image six times to provide inversion of the image. Inasmuch as the light path through the prisms is relatively long, the spacing between the objective and the eyepiece lenses may be shortened substantially to produce a short instrument of relatively high magnification.

A novel feature of the invention is the provision of a simple mounting for the prisms whereby the prisms and the cooperating lenses may be assembled easily and precisely in the lens tube. More particularly, the prism is shaped so that the two elements thereof, when properly positioned, are in contact with the inner walls of the tube to prevent them from shifting relatively in one direction. They are further prevented from moving relatively in a transverse direction by means of spring shims which bear against the sides of the prisms and the inside of the lens tube.

The above-described system does away with complicated and heavy supports for positioning and fixing a prism in a lens tube and also eliminates the offset portion of the lens tube which characterizes the prior prism monocular telescopes and binoculars.

For a better understanding of the present invention, reference may be had to the accompanying drawing, in which:

Figure 1 is a view in longitudinal section of a typical form of telescope embodying the present invention;

Figure 2 is a view in side elevation of the prism system utilized in the telescope;

Figure 3 is an end view of the assembled prisms;

Figure 4 is a view in elevation looking toward the opposite end of the prisms; and Figure 5 is a view in section taken on line 5—5 of Figure 1.

Referring now to Figure 1, the telescope includes a cylindrical lens tube 10 which is threaded at its left-hand end in order to receive an internally threaded sleeve 11 by means of which a two element objective lens 12 is retained in the end of the lens tube.

The casing is further provided with an internal shoulder 13 against which is positioned an annular baffle member 14. Preferably, the baffle member 14 is press-fitted in the tube 10. Adjacent to the baffle 14 is an annular prism positioning washer 15 which engages a shoulder 16 within the lens tube so that the washer is held in a predetermined relationship to the objective lens 12. Abutting the washer 15 is the prism member 17 which is retained against axial movement by means of an annular nut or washer 18 having a threaded periphery 18a and a tapered opening 18b through its center. The washer 18 may be provided with notches 18c to aid in screwing it into the tube 10.

The right-hand end of the casing 10 is provided with a collar 19 which is screwed into the end of the lens tube 10. The collar 19 is provided with internal threads 19a. The threads 19a engage the external threads 20a on the tube 20 in which the eyepiece lenses 21 and 22 are mounted. The collar 20 is provided with a radial flange 20b which limits the outward movement of the collar 20 relatively to the collar 19.

The eyepiece lenses 21 and 22 in the lens tube 20 are adjusted relatively to the lens tube 10 by means of a knurled member 23, which is provided with a flange 23a disposed concentric with and around the end of the lens tube 10. The flange 23a may be provided with a suitable diopter scale, not shown. The member 23 preferably is shrunk on the end of the lens mounting tube 20 and is provided with an inwardly turned shoulder 23b which engages the lens 22. The lenses 21 and 22 are further retained in fixed relation to the lens mounting tube 20 by means of a spacer ring 24 disposed between the edges of the lenses and a tubular member 25 which is threaded into the end of the tube 20 to position the lens element 21 against the spacing sleeve 24. The above-described mount for the eyepiece lenses permits the lenses to be disassembled for cleaning purposes but prevents them from being loosened or removed by turning the adjusting sleeve 23.

The prism 17 utilized in this telescope system includes a triangular roof-prism element 26 and a triangular prism element 27. The prism 26 has a face 26a disposed normal to the axis of the entering ray of light and is provided with an opposite reflecting surface 26b disposed at a 45° angle to the surface 26a. The prism member 26 is further provided with a roof-prism portion consisting of the two 90° related surfaces 26c and 26b which are inclined so that their common edge is disposed at an angle of 67½° to the surface 26a.

The prism member 27 is provided with a surface 27a which is inclined at a 45° angle to the emergent face 27b which is parallel with the face 26a of the prism 26. The prism 27 is also provided with a reflecting surface 27c which is disposed at an angle of 112.5° to the face 27b. These prisms are of appropriate dimensions to fit within a lens tube 10 of a predetermined diameter. In order to obtain a firm and secure fit while retaining a maximum effective reflecting surface area, one end of the face 27c may be ground on a radius equal to the radius of the lens tube to provide a cylindrical surface 27d which conforms to the interior curvature of the tube 10, as shown in Figure 5. Also, the lower corner of the roof-prism element 26 may be ground on the same radius to provide a rounded edge portion 26d which fits the inner wall of the tube 10. When the two prism elements 26 and 27 are assembled one on top of the other with their faces 26b and 27a in opposed relation and placed within the lens tube 10, they will slide relatively into engagement with the inner wall of the lens tube 10. Lateral movement of the prism elements 26 and 27 is prevented by means of the curved spring shims 28 and 29, Figures 1 and 5, which have their mid-portions bearing against the sides of the prisms 26 and 27 and their ends bearing against the wall of the tube 10. The prisms are fixed against movement axially of the lens tube 10 by means of the lock nut 18.

The surfaces of the prisms may be suitably treated in order to improve their light-transmitting and reflecting characteristics, for example, the surfaces 26a, 26b, 27a and 27b may be provided with an anti-reflection coating while the prism surface 27c may be silvered in order to improve its reflecting properties, inasmuch as the light rays do not impinge upon the surface at a full reflecting angle.

In a typical telescope of the type described above, the effective focal length of the objective lens is 117.56 mm. The eyepiece lens combination has an effective focal length of 15 mm. Using these lenses in combination with a prism 17 having a maximum transverse dimension of 29.44 mm. and an axial length of 19.7 mm., an 8 power telescope is provided which has an overall length of about 4½ inches and a maximum external diameter of about 1¼ inches.

From the preceding description, it will be clear that the above-described telescope is much more compact than prior telescopes of the all-lens and prism types of equal power. Moreover, the overall weight of the telescope is reduced to only a fraction of the weight of similar power telescopes of either the prism or lens type because of the smaller lens tube and light-weight mount for the prism. In addition, telescopes of the type described above have an excellent field, and because practically all of the light is fully reflected in the prism, the telescopes are exceptionally efficient in light-transmitting characteristics.

It will be understood that telescopes of the type described above may be used as monocular instruments or two of these telescopes may be combined in a suitable mounting to form compact and light-weight binoculars.

It will be understood further that the lens tube 10 may be covered with leather or fabric and that suitable lens caps and other accessories may be provided for use with it.

If desired, the focal lengths and dimensions of the lenses and the prisms may be modified considerably to provide systems having greater magnification without sacrificing compactness and light-weight as compared with other monocular telescopes or binoculars of equal power. Therefore, the form of the invention described above should be considered as illustrative of the invention and not as limiting the scope of the following claims.

I claim:

1. In a telescope having a straight cylindrical tube, an objective lens at one end of said tube, eyepiece lens elements at the opposite end of said tube, and means for adjusting said eyepiece lens elements axially of said tube; the combination of a mount for an inverting prism having two separate prism elements, said elements having parallel opposite outer surfaces perpendicular to the axis of said tube, opposed complemental inner surfaces inclined to said parallel surfaces, other reflecting surfaces and substantially parallel lateral sides, said prism being effective to transmit and invert an entering beam so that the axis of the emergent beam is coaxial with the axis of the entering beam, said mount comprising a ring mounted in said tube to engage one of said outer parallel surfaces of one of said prism elements to retain said prism against movement toward said objective lens, a locking washer engaging the outer parallel surface of the other prism element and urging opposite ends of said prism elements against opposite sides of said tube, and spring members engaging the lateral sides of both of said prism elements and said tube for restraining them against sidewise movement in said tube.

2. In a telescope having a cylindrical tube, an objective lens adjacent to one end of said tube, eyepiece lens elements adjacent to the other end of said tube, and means for adjusting said eyepiece lens element axially of said lens tube; the combination of a mount for a prism consisting of two prism elements having opposed inner inclined faces, opposite parallel outer end faces perpendicular to the axis of said tube and substantially parallel opposite sides, said mount comprising a positioning washer in said lens tube for supporting one of said prism elements with its outer end face normal to the axis of said tube, an annular locking nut in said tube on the opposite side of said prism from said positioning washer and engaging the outer end face of the other of said prism elements to hold said prism elements with their inclined faces parallel and in opposition and their outermost corners in engagement with opposite sides of the tube, and spring members bearing against said lens tube and engaging said parallel opposite sides of said prism elements for retaining them against relative sidewise movement in said tube.

3. In a telescope having a cylindrical tube, an objective lens adjacent to one end of said tube, eyepiece lens elements adjacent to the other end of said tube, and means for adjusting said eyepiece lens element axially of said lens tube, the combination of a mount for a prism consisting of two prism elements having opposed, inner, inclined faces; opposite, outer, parallel end faces and substantially parallel lateral sides, one of said prism elements having roof-reflecting surfaces at one outer side, and the other prism element having an inclined reflecting surface at the opposite outer side, whereby the axis of an entering light beam is reflected coincident with the axis of the emergent light beam, said mount comprising a positioning washer in said lens tube for supporting one of said prism elements with its said opposite outer end face normal to the axis of said tube, an annular locking nut in said tube on the opposite side of said prism from said positioning washer and engaging the outer end face of the other of said prism elements to retain the inclined inner faces of said prism elements parallel and the outer end faces also parallel, said prism elements being relatively slidable on their inner inclined faces into engagement with opposite sides of the tube, said washer and said nut also holding said prism elements in engagement with said opposite sides of said tube, and arcuate spring members in said lens tube having their mid-portions engaging the lateral sides of said prism elements and their ends engaging said tube to retain said prism elements against relative sidewise movement in said tube.

CHESTER BRANDON.

REFERENCES CITED

The following references are of record in the file of this patent:

UNITED STATES PATENTS

| Number | Name | Date |
| --- | --- | --- |
| 731,101 | Fecker | June 16, 1903 |
| 1,254,741 | Stout | Jan. 29, 1918 |
| 1,324,448 | Gremer | Dec. 9, 1919 |
| 1,482,893 | Hart | Feb. 5, 1924 |
| 1,510,732 | Wollensak | Oct. 7, 1924 |
| 2,039,709 | Crumrine | May 5, 1936 |
| 2,400,252 | Noske | May 14, 1946 |
| 2,424,339 | Stechbart et al. | July 22, 1947 |
| 2,442,564 | Heyer | June 1, 1948 |

FOREIGN PATENTS

| Number | Country | Date |
| --- | --- | --- |
| 93,430 | Austria | July 10, 1923 |